(12) United States Patent
Kwon et al.

(10) Patent No.: US 9,474,056 B2
(45) Date of Patent: Oct. 18, 2016

(54) METHOD IN WHICH A RECEIVER TRANSMITS CONTROL INFORMATION IN A WIRELESS COMMUNICATION SYSTEM

(71) Applicant: LG ELECTRONICS INC., Seoul (KR)

(72) Inventors: Yeong Hyeon Kwon, Anyang-si (KR); So Yeon Kim, Anyang-si (KR); Sung Ho Moon, Anyang-si (KR); Jae Hoon Chung, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/626,512

(22) Filed: Feb. 19, 2015

(65) Prior Publication Data

US 2015/0163798 A1  Jun. 11, 2015

Related U.S. Application Data

(63) Continuation of application No. 13/384,123, filed as application No. PCT/KR2010/004497 on Jul. 9, 2010, now Pat. No. 8,995,364.

(60) Provisional application No. 61/225,924, filed on Jul. 16, 2009.

(51) Int. Cl.
| | | |
|---|---|---|
| *H04W 4/00* | (2009.01) | |
| *H04W 72/04* | (2009.01) | |
| *H04L 1/00* | (2006.01) | |
| *H04L 1/16* | (2006.01) | |
| *H04L 5/00* | (2006.01) | |
| *H04W 28/04* | (2009.01) | |

(52) U.S. Cl.
CPC ........ *H04W 72/0413* (2013.01); *H04L 1/0029* (2013.01); *H04L 1/1607* (2013.01); *H04L 5/0007* (2013.01); *H04L 5/0053* (2013.01); *H04L 5/0055* (2013.01); *H04W 28/04* (2013.01)

(58) Field of Classification Search
None
See application file for complete search history.

(56) References Cited

U.S. PATENT DOCUMENTS

| | | | |
|---|---|---|---|
| 8,050,683 B2* | 11/2011 | Brueck | H04W 36/30 370/332 |
| 8,391,244 B2* | 3/2013 | Choi | H04W 36/0088 370/310.2 |
| 8,396,030 B2* | 3/2013 | Frederiksen et al. | 370/329 |
| 8,442,566 B2* | 5/2013 | Liu | H04W 48/16 455/452.1 |
| 8,477,734 B2* | 7/2013 | Sambhwani | H04L 1/1671 370/332 |
| 8,861,472 B2* | 10/2014 | Frederiksen et al. | 370/329 |
| 2008/0170634 A1 | 7/2008 | Kwak et al. | |
| 2009/0055703 A1 | 2/2009 | Kim et al. | |
| 2009/0110114 A1 | 4/2009 | Onggosanusi et al. | |
| 2009/0199055 A1 | 8/2009 | Chen et al. | |

(Continued)

FOREIGN PATENT DOCUMENTS

| | | |
|---|---|---|
| KR | 10-2008-0073616 A | 11/2008 |
| WO | WO 2007/148710 A1 | 12/2007 |

*Primary Examiner* — Phirin Sam
(74) *Attorney, Agent, or Firm* — Birch, Stewart, Kolasch & Birch, LLP

(57) ABSTRACT

A method and a receiver are described for transmitting control information in a wireless communication system. The receiver is configured to receive a plurality of data units from a transmitter, determine acknowledgement/negative-acknowledgement (ACK/NACK) states for each of the data units; and transmit, to the transmitter, the ACK/NACK states in multiple ACK/NACK states or in a single ACK/NACK state in accordance with a predetermined condition.

8 Claims, 13 Drawing Sheets

(56) References Cited

U.S. PATENT DOCUMENTS

| | | | |
|---|---|---|---|
| 2009/0245212 A1* | 10/2009 | Sambhwani et al. | 370/336 |
| 2009/0303978 A1* | 12/2009 | Pajukoski et al. | 370/345 |
| 2009/0323617 A1 | 12/2009 | Che et al. | |
| 2010/0074208 A1* | 3/2010 | Farajidana et al. | 370/329 |
| 2010/0232311 A1 | 9/2010 | Zhang et al. | |
| 2010/0232373 A1 | 9/2010 | Nory et al. | |
| 2010/0232382 A1 | 9/2010 | Gauvreau et al. | |
| 2010/0272048 A1* | 10/2010 | Pan et al. | 370/329 |
| 2011/0141878 A1 | 6/2011 | Che et al. | |
| 2011/0268032 A1 | 11/2011 | Kim et al. | |
| 2012/0294207 A1 | 11/2012 | Ahn et al. | |

* cited by examiner

PUCCH format 1a and 1b structure (normal CP case)

METHOD IN WHICH A RECEIVER TRANSMITS CONTROL INFORMATION IN A WIRELESS COMMUNICATION SYSTEM

CROSS-REFERENCE TO RELATED APPLICATIONS

This application is a Continuation of co-pending U.S. application Ser. No. 13/384,123 filed Jan. 13, 2012, which is the National Phase of PCT/KR2010/004497 filed on Jul. 9, 2010, which claims priority under 35 U.S.C. §119(e) to U.S. Provisional Application No. 61/225,924 filed on Jul. 16, 2009. The contents of all of these applications are hereby incorporated by reference as fully set forth herein, in their entirety.

BACKGROUND OF THE INVENTION

1. Field of Invention

The present invention relates to a method for allowing a receiver to transmit control information in a wireless communication system, and more particularly, to a method for efficiently transmitting control information such as an acknowledgement/negative-acknowledgement (ACK/NACK) signal and an apparatus for the same.

2. Discussion of the Related Art

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system. In the wireless communication system, a user equipment may receive information from a base station through a downlink, and may transmit information to the base station through an uplink. Examples of information transmitted from or received in the user equipment include data and various kinds of control information. Various physical channels exist depending on a type and usage of the information transmitted from or received in the user equipment.

In the wireless communication system, since a channel between a transmitter and a receiver is not fixed, it is required to frequently measure a channel between a transmitting antenna and a receiving antenna. If the transmitter and the receiver transmit and receive a signal mutually prescribed to and from each other to measure a channel, a phase shifted value and a decreasing amount of amplitude caused by the channel may be identified. And, the identified information may be fed back to a transmitting side. Alternatively, data information which is not prescribed may reliably be detected and decoded using the identified information. The signal prescribed between the transmitter and the receiver may be referred to as a reference signal, a pilot signal or a sounding reference signal.

A 3rd generation partnership project long term evolution (3GPP LTE) communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may generally be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, carrier aggregation aims to use a plurality of frequency blocks as one great logical frequency band. A bandwidth of each frequency block may be defined based on a bandwidth of a system block used in the LTE system. Each frequency block is transmitted using a component carrier.

SUMMARY OF THE INVENTION

An object of the present invention devised to solve the conventional problem is to provide to a method for efficiently transmitting feedback information from a receiver to a transmitter by reducing feedback information.

Another object of the present invention is to provide a method for efficiently managing resources by reducing a control channel resource used for feedback information transmission, whereby resources used for data transmission can be increased.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, as embodied and broadly described herein, according to one embodiment of the present invention, a method for transmitting control information from a receiver in a wireless communication system comprises the steps of receiving a plurality of data units from a transmitter; determining acknowledgement/negative-acknowledgement (ACK/NACK) states for each of the data units; and transmitting, to the transmitter, the ACK/NACK states in multiple ACK/NACK states or in a single ACK/NACK state in accordance with a predetermined condition.

The plurality of ACK/NACK states may be configured in the single NACK state when the plurality of ACK/NACK states include more than a certain number of NACKs.

The plurality of data units may be received through a plurality of carriers.

The plurality of ACK/NACK states may be configured in the multiple ACK/NACK states or the single ACK/NACK state on the basis of carrier group.

At this time, the control information may be configured per carrier, and control information transmitted through different carriers depending on a type of each of the plurality of carriers may be multiplexed on the basis of the carrier group.

To achieve these objects and other advantages and in accordance with the purpose of the invention, as embodied and broadly described herein, according to another embodiment of the present invention, a receiver in a wireless communication system comprises a reception (Rx) module for receiving a plurality of data units from a transmitter; a transmission (Tx) module for transmitting radio frequency (RF) signals to the transmitter; and a processor determining acknowledgement/negative-acknowledgement (ACK/NACK) states for each of the data units received through the Rx module, wherein the processor configures the ACK/NACK states in multiple ACK/NACK states or in a single ACK/NACK state in accordance with a predetermined condition and transmits the ACK/NACK states to the transmitter through the Tx module.

The processor may configure the plurality of ACK/NACK states in the single NACK state when the plurality of ACK/NACK states include more than a certain number of NACKs.

Also, the processor may configure the plurality of ACK/NACK states in the multiple ACK/NACK states or the single ACK/NACK state on the basis of carrier group.

The aforementioned embodiments of the present invention are only a part of the preferred embodiments of the present invention, and various embodiments in which technical features of the present invention are reflected may be devised and understood based on the detailed description of the present invention, which will be described later, by the person with ordinary skill in the art.

Advantageous Effects

According to the embodiments of the present invention, the receiver may efficiently transmit feedback information to the transmitter by reducing a feedback information rate.

In addition, according to the embodiments of the present invention, a control channel resource used for feedback transmission from the receiver to the transmitter may be reduced to efficiently manage resources, whereby a resource used for other data transmission may be increased.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
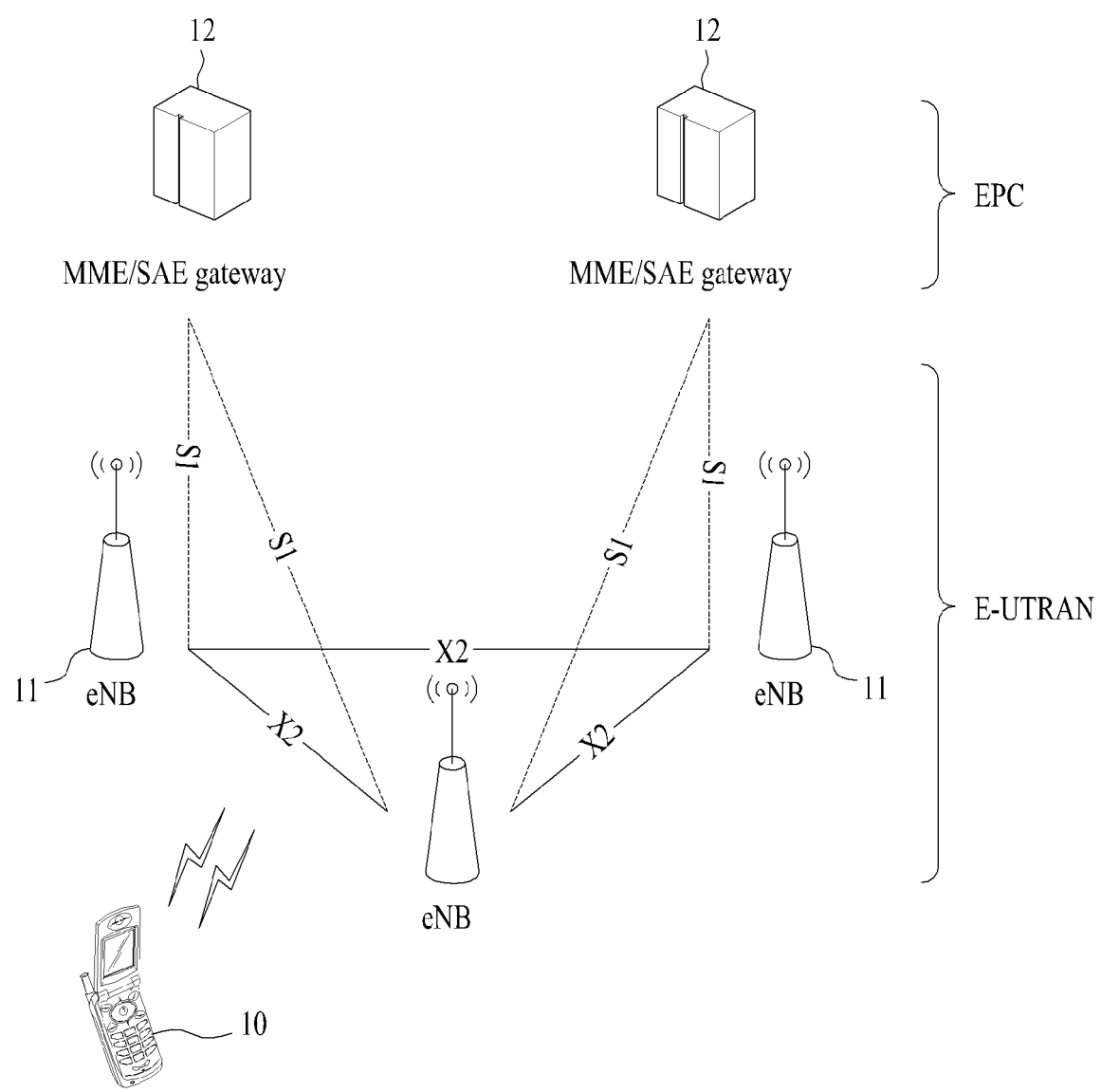
FIG. 1 is a diagram illustrating a network structure of an Evolved Universal Mobile Telecommunications System (E-UMTS) which is an example of a mobile communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE system, the following description may be applied to other mobile communication systems except for unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment means a mobile or fixed type user terminal such as a mobile station (MS). It is also assumed that a base station means a random node of a network node, such as Node B and eNode B, which performs communication with a user equipment.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE.

To clarify description of the present invention, although the present invention will be described based on 3GPP LTE/LTE-A, it is to be understood that technical features of the present invention are not limited to the 3GPP LTE/LTE-A.

In a wireless communication system, a user equipment may receive information from a base station through a downlink, and may also transmit information to the base station through an uplink. Examples of information transmitted from or received in the user equipment include data and various kinds of control information. Various physical channels exist depending on a type and usage of the information transmitted from or received in the user equipment.

Figure 2:
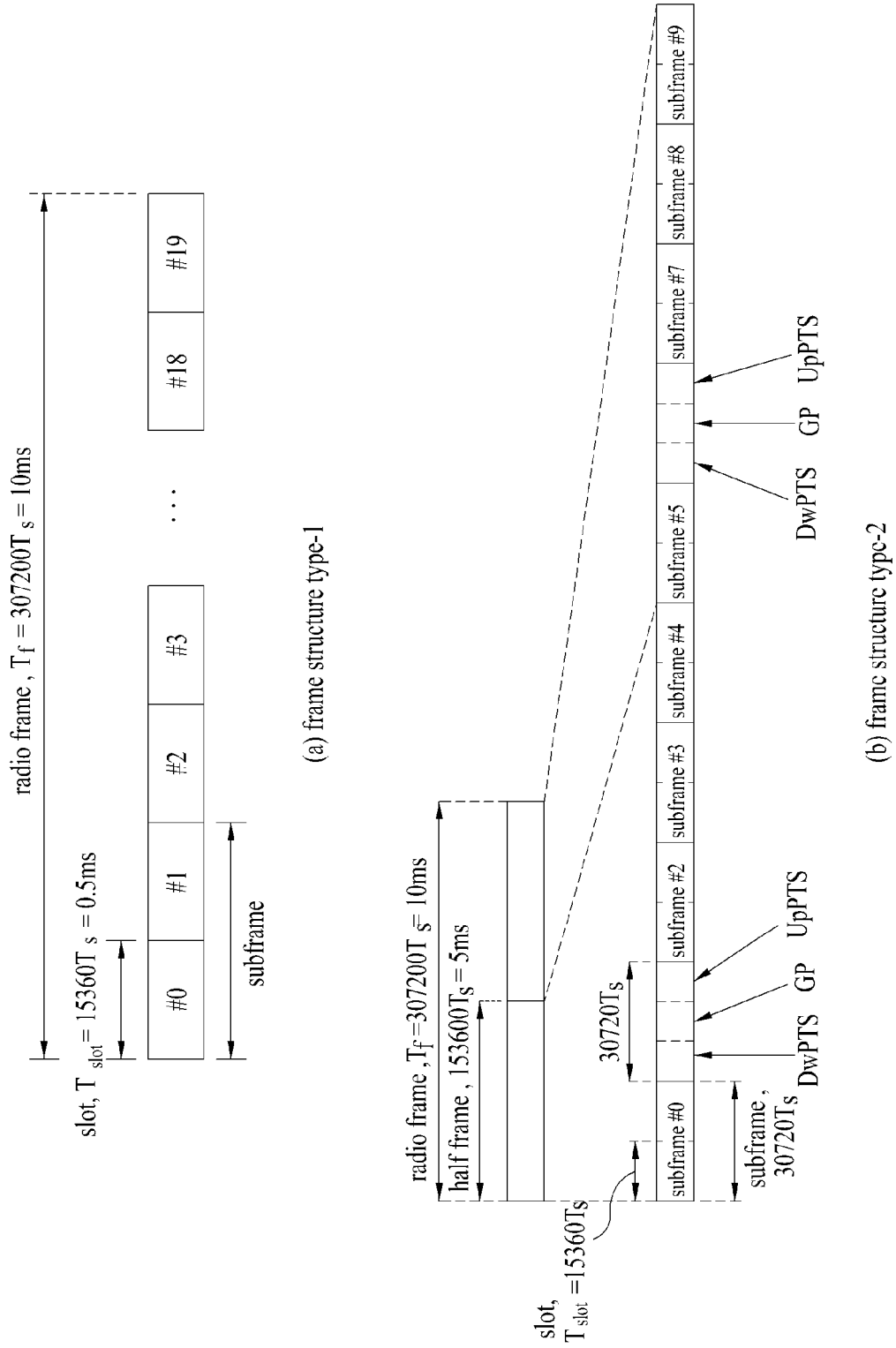
FIG. 2, including (a) and (b), is a diagram illustrating a structure of a radio frame used in a 3GPP LTE system.

FIG. 2 is a diagram illustrating a structure of a radio frame used in an LTE system.

Referring to (a) of FIG. 2, a frame structure type-1 has a length of 10 ms (327200·Ts) and includes ten (10) subframes of an equal size. Each subframe has a length of 1 ms and includes two slots each having a length of 0.5 ms. In this case, Ts represents a sampling time, and is expressed by Ts=1/(15 kHz×2048)=3.2552×10$^{-8}$ (about 33 ns). The slot includes a plurality of OFDM symbols (or SC-FDMA symbols) in a time domain, and includes a plurality of resource blocks (RBs) in a frequency domain. In the LTE system, one resource block includes twelve (12) subcarriers×seven (or six) OFDM (or SC-FDMA) symbols. Referring to (b) of FIG. 2, a frame structure type-2 includes two half frames, each of which includes five subframes, a downlink piloting time slot (DwPTS), a guard period (GP), and an uplink piloting time slot (UpPTS). The aforementioned structure of the radio frame is only exemplary, and various modifications may be made in the number of subframes included in the radio frame or the number of slots included in the subframe, or the number of OFDM (or SC-FDMA) symbols included in the slot.

Figure 3:
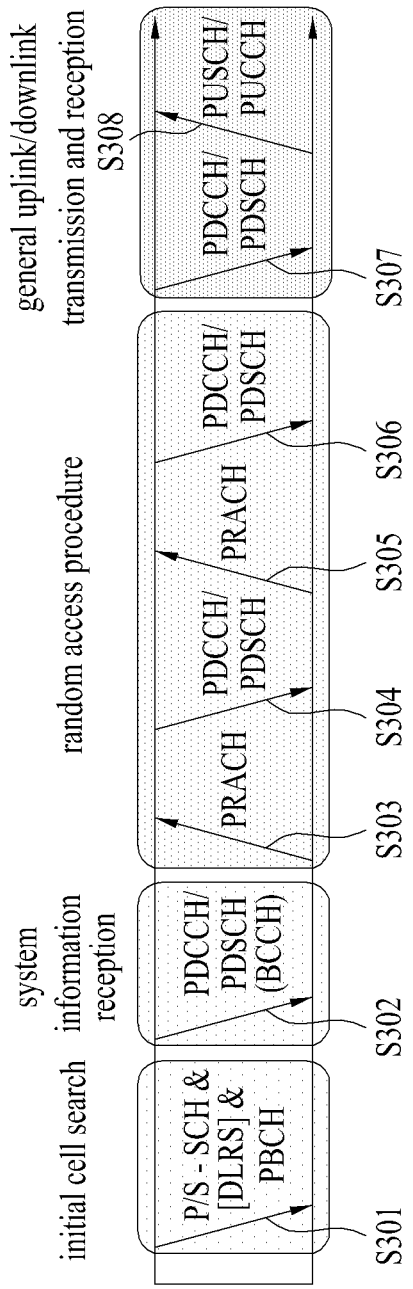
FIG. 3 is a diagram illustrating physical channels used in a 3GPP LTE system and signal transmission using the physical channels.

FIG. 3 is a diagram illustrating physical channels used in an LTE system and signal transmission using the physical channels.

Referring to FIG. 3, the user equipment performs initial cell search such as synchronizing with the base station when it newly enters a cell or the power is turned on (S310). To this end, the user equipment may synchronize with the base station by receiving a primary synchronization channel (P-SCH) and a secondary synchronization channel (S-SCH) from the base station, and may acquire information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S320).

Meanwhile, if the user equipment initially accesses the base station, or if there is no radio resource for signal transmission, the user equipment may perform a random access procedure (RACH) for the base station (S330 to S360). To this end, the user equipment may transmit a preamble of a specific sequence through a physical random access channel (PRACH) (S330 and S350), and may receive a response message to the preamble through the PDCCH and the PDSCH corresponding to the PDCCH (S340 and S360). In case of a contention based RACH, a contention resolution procedure may be performed additionally.

The user equipment which has performed the aforementioned steps may receive the PDCCH/PDSCH (S370) and transmit a physical uplink shared channel (PUSCH) and a physical uplink control channel (PUCCH) (S380), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment may transmit the aforementioned control information such as CQI/PMI/RI through the PUSCH and/or the PUCCH.

Figure 4:
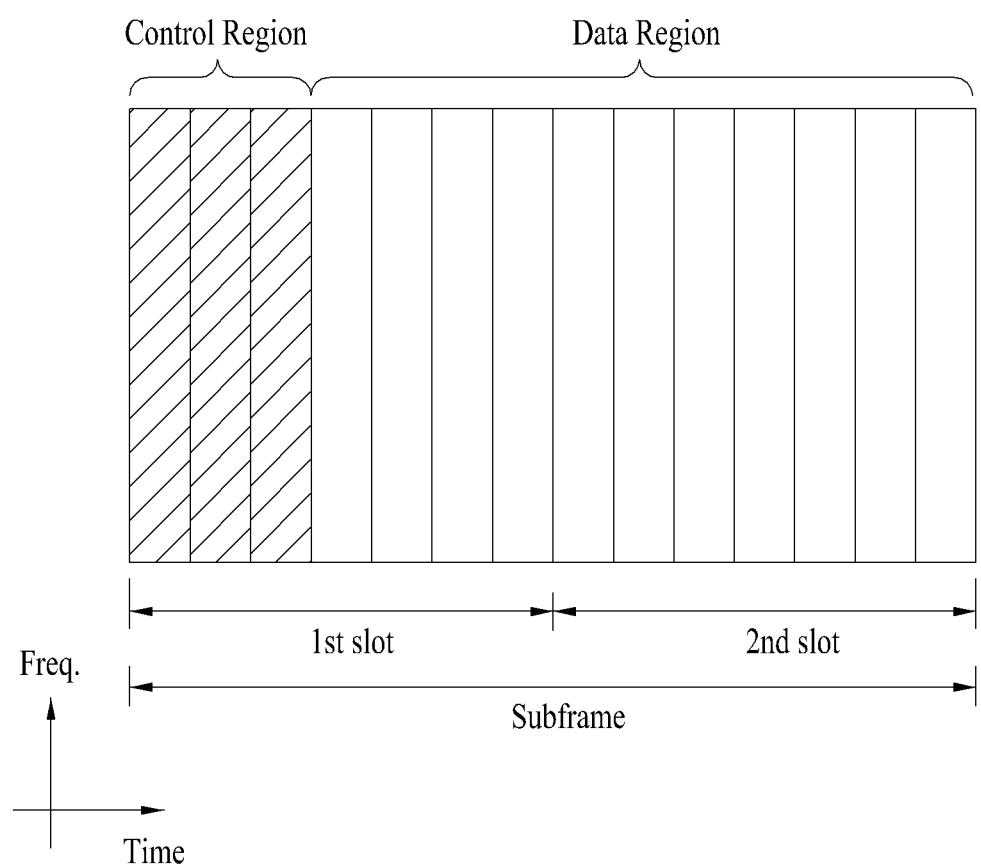
FIG. 4 is a diagram illustrating a structure of a downlink subframe.

FIG. 4 is a diagram illustrating a structure of a downlink subframe.

Referring to FIG. 4, one subframe includes two slots in a time domain. Maximum three OFDM symbols located at the front of the first slot of the subframe correspond to a control region to which control channels are allocated. The other OFDM symbols correspond to a data region to which a physical downlink shared channel (PDSCH) is allocated.

Examples of the downlink control channel used in the 3GPP LTE include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number (that is, size of control region) of OFDM symbols used for transmission of the control channels within the subframe. The control information transmitted through the PDCCH will be referred to as downlink control information (DCI). The DCI includes uplink resource allocation information, downlink resource allocation information, uplink transmission (Tx) power control command for random user equipment groups, etc. The PHICH carries HARQ ACK/NACK (acknowledgement/negative-acknowledgement) in response to uplink HARQ. In other words, the ACK/NACK signal for uplink data transmitted from the user equipment is transmitted onto the PHICH.

Hereinafter, the PDCCH will be described.

The PDCCH may carry resource allocation and transport format (may be referred to as downlink grant) of the PDSCH, resource allocation information (may be referred to as uplink grant) of the PUSCH, aggregation of transmission power control commands of individual user equipments (UEs) within a random user equipment group, and activity indication information of voice over Internet protocol (VoIP). A plurality of PDCCHs may be transmitted within the control region. The user equipment may monitor the plurality of PDCCHs. The PDCCH is comprised of aggregation of one or a plurality of continuous control channel elements (CCEs). The PDCCH comprised of aggregation of one or a plurality of continuous CCEs may be transmitted through the control region after subblong interleaving. The CCE is a logic allocation unit used to provide a coding rate based on the status of a radio channel to the PDCCH. The CCE corresponds to a plurality of resource element groups (REGs). The format of the PDCCH and the number of available bits of the PDCCH are determined depending on correlation between the number of CCEs and the coding rate provided by the CCEs.

The control information transmitted through the PDCCH will be referred to as downlink control information (DCI). The following Table 1 illustrates the DCI based on a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

The DCI format 0 represents uplink resource allocation information, the DCI formats 1 and 2 represent downlink resource allocation information, and the DCI formats 3 and 3A represent uplink transmit power control (TPC) command for random user equipment groups.

Figure 5:
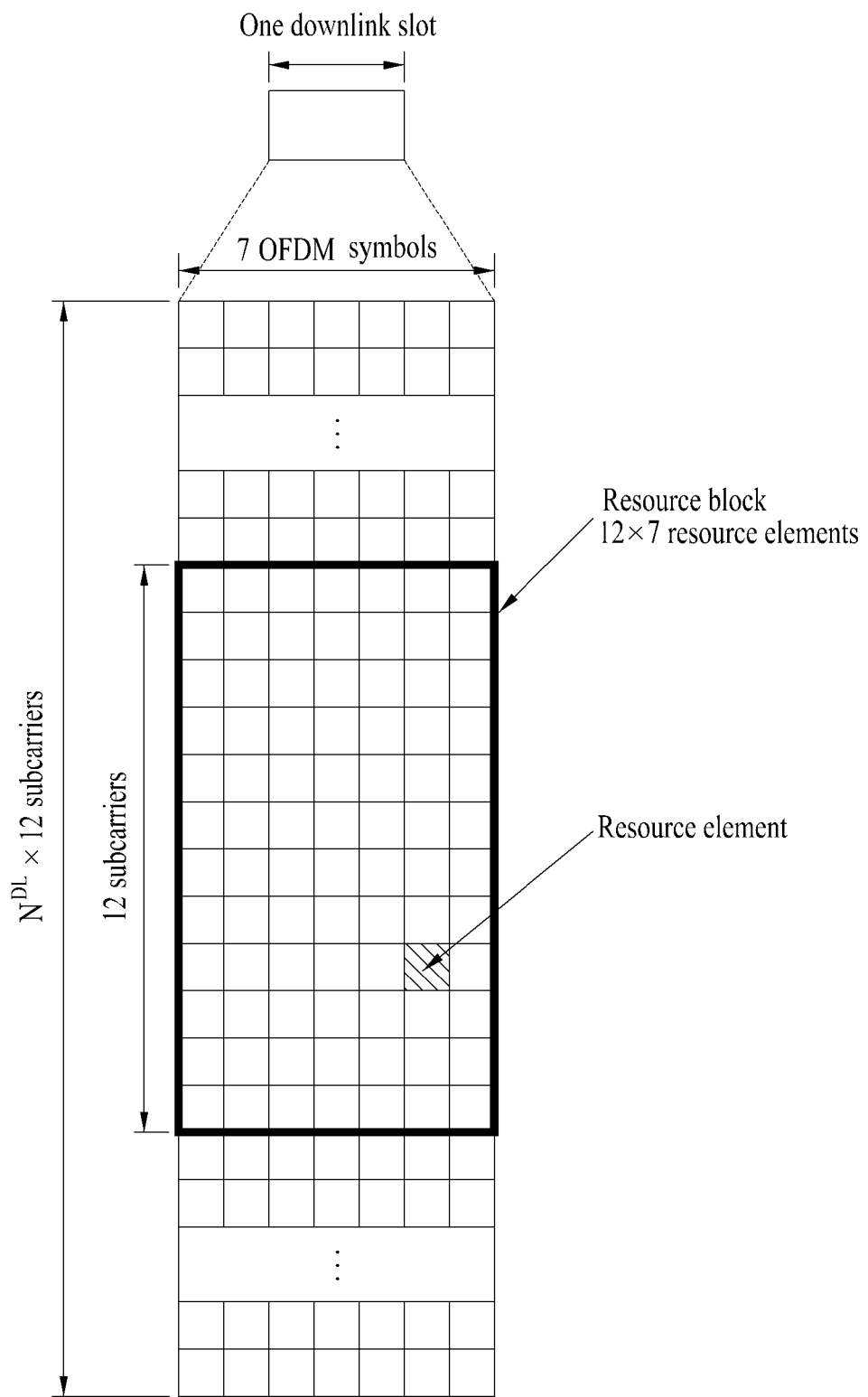
FIG. 5 is a diagram illustrating a time-frequency resource grid structure of a downlink slot used in a 3GPP LTE system.

FIG. 5 is a diagram illustrating a time-frequency resource grid structure of a downlink slot used in a 3GPP LTE system which is an example of a mobile communication system.

Referring to FIG. 5, a downlink signal transmitted from each slot may be expressed by a resource grid as shown in FIG. 1, which includes $N_{RB}^{DL} \times N_{sc}^{RB}$ number of subcarriers and $N_{symb}^{DL}$ number of OFDM (orthogonal frequency division multiplexing) symbols. In this case, $N_{RB}^{DL}$ represents the number of resource blocks (RBs) in the downlink, $N_{sc}^{RB}$ represents the number of subcarriers that constitute one resource block (RB), and $N_{symb}^{DL}$ represents the number of OFDM symbols at one downlink slot. The size of $N_{RB}^{DL}$ may be varied depending on a downlink transmission bandwidth configured within a cell and should satisfy $N_{RB}^{min,DL} \leq N_{RB}^{DL} \leq N_{RB}^{max,DL}$. In this case, $N_{RB}^{min,DL}$ is the smallest downlink bandwidth supported by the wireless communication system, and $N_{RB}^{max,DL}$ is the greatest downlink bandwidth supported by the wireless communication system. Although $N_{RB}^{min,DL}=6$ and $N_{RB}^{max,DL}=110$ may be provided, the present invention is not limited to this example. The number of OFDM symbols included in one slot may be varied depending on a length of cyclic prefix (CP) and interval of the subcarriers. In case of MIMO antenna transmission, one resource grid may be defined per one antenna port.

Each element within the resource grid for each antenna port is referred to as a resource element (RE), and is uniquely identified by a pair of indexes within the slot. In this case, k is an index in a frequency domain, 1 is an index in a time domain. Also, k has any one value of $0, \ldots, N_{RB}^{DL} N_{sc}^{RB}-1$, and 1 has any one value of $0, \ldots, N_{symb}^{DL}-1$.

If the time-frequency resource grid structure shown in FIG. 5 is applied to the uplink, each symbol may be referred to as SC-FDMA symbol.

Figure 6:
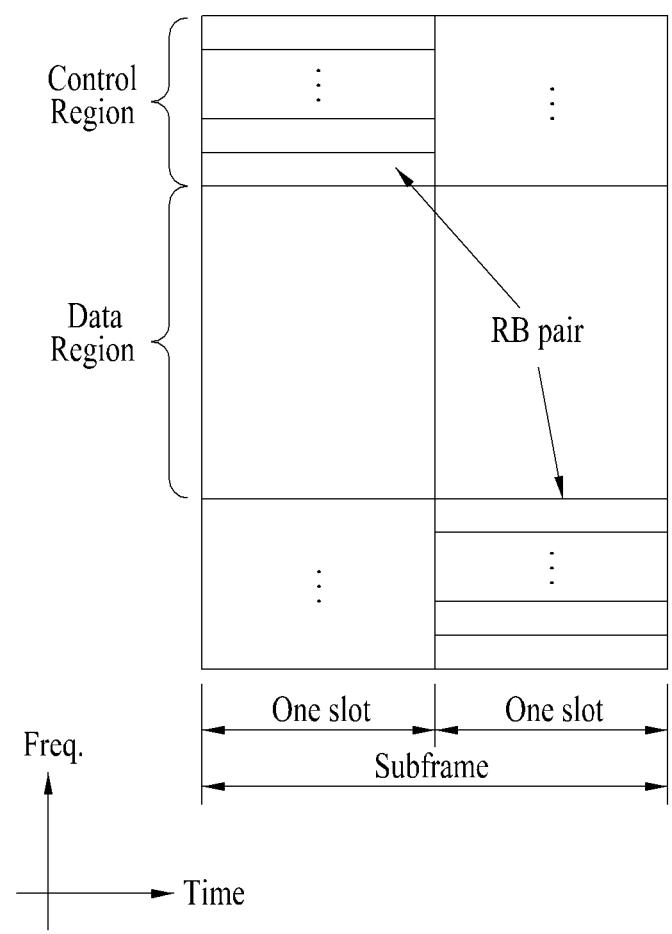
FIG. 6 is a diagram illustrating a structure of an uplink subframe used in an LTE system.

FIG. 6 is a diagram illustrating a structure of an uplink subframe in the LTE.

Referring to FIG. 6, the uplink subframe includes a plurality of slots (for example, two slots). The uplink subframe is divided into a data region and a control region on the frequency domain. The data region includes a physical uplink shared channel (PUSCH), and is used to transmit a data signal such as voice and video. The control region includes a physical uplink control channel (PUCCH), and is used to transmit control information. The PUCCH includes RB pair located at both ends of the data region on a frequency axis, and performs hopping on the border of the slots. The control information includes Hybrid Automatic Retransmit reQuest (HARQ) ACK/NACK.

Figure 7:
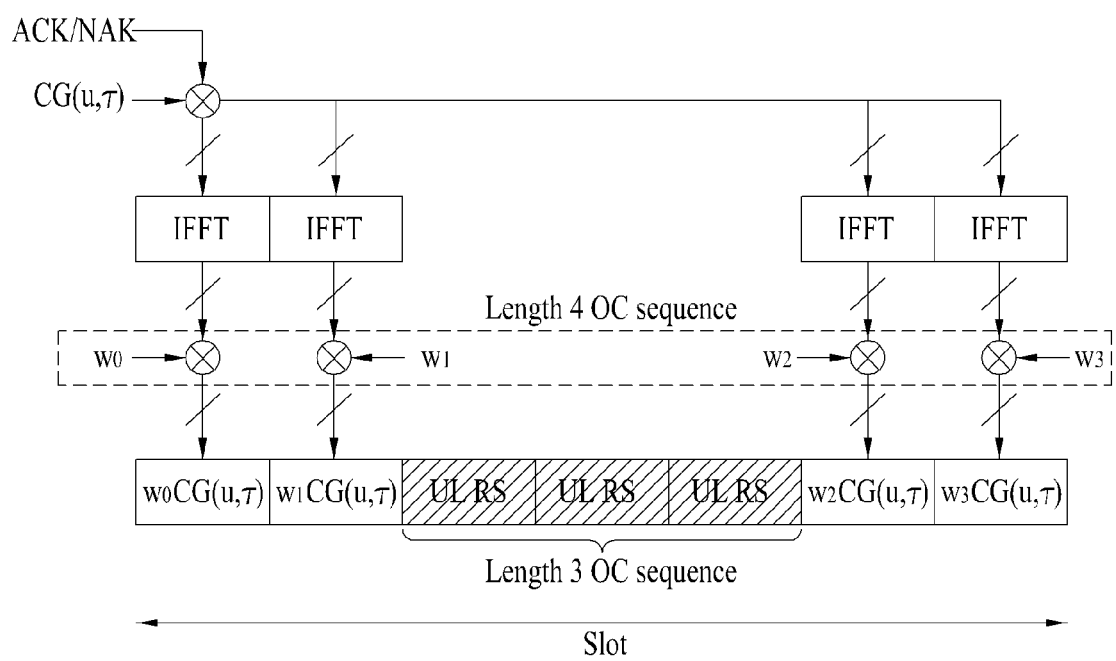
FIG. 7 is a diagram illustrating a PUCCH structure for ACK/NACK transmission.

FIG. 7 is a diagram illustrating a structure of a physical uplink control channel (PUCCH) resource for ACK/NACK transmission.

Referring to FIG. 7, in case of a normal cyclic prefix (CP), a reference signal (UL RS) is carried in three continuous symbols located at the center of the slot, and control information (i.e., ACK/NACK) is carried in the other four symbols. In case of an extended CP, the slot includes six symbols, wherein a reference signal is carried in the third and fourth symbols. The ACK/NACK from several user equipments is multiplexed with one PUCCH resource by using a CDM mode. The CDM mode is implemented using cyclic shift (CS) of a sequence for frequency spreading and/or (pseudo)orthogonal spreading code for time spreading. For example, the ACK/NACK identified using different cyclic shifts (CS) (frequency spreading) of computer generated constant amplitude zero auto correlation (CG-CA-ZAC) sequence and/or different walsh/DFT orthogonal codes (time spreading). w0, w1, w2, w3 multiplied after IFFT obtain the same result even though they are multiplied before IFFT. In the LTE system, the PUCCH resources for transmitting ACK/NACK are expressed by combination of the cyclic shift of the sequence for frequency spreading and the (pseudo)orthogonal spreading code for time spreading and the location of the frequency-time resource (for example, resource block), and each PUCCH resource is indicated using a PUCCH (resource) index.

Figure 8:
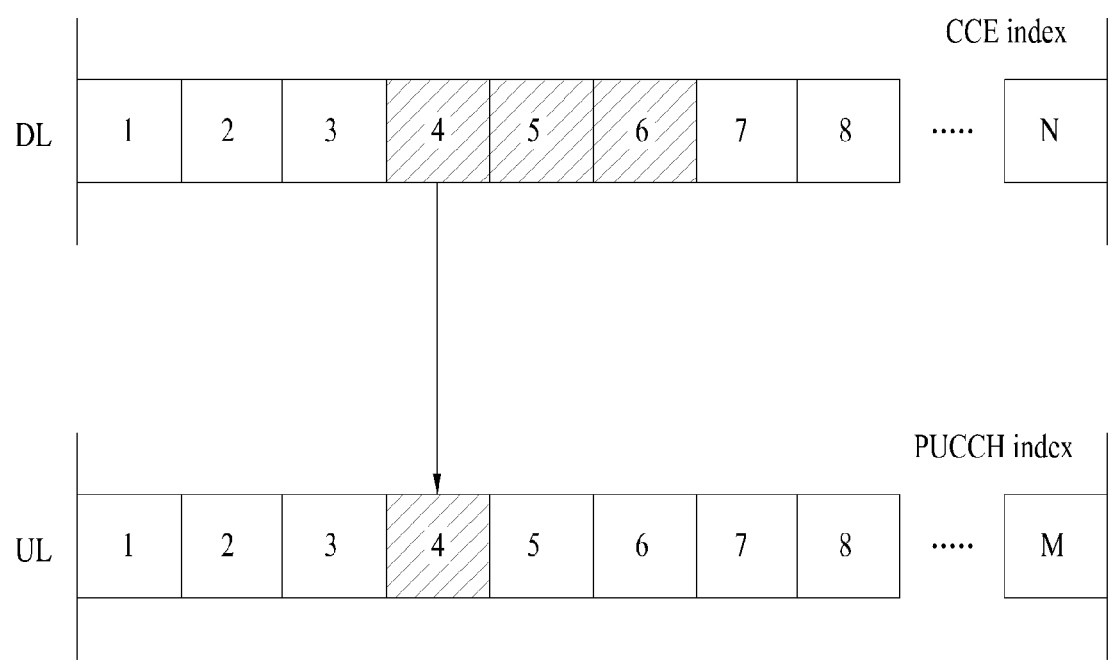
FIG. 8 is a diagram illustrating an example of determining a PUCCH resource for ACK/NACK.

FIG. 8 is a diagram illustrating an example of determining PUCCH resources for ACK/NACK.

In the LTE system, PUCCH resources for ACK/NACK are not previously allocated to each user equipment but used per timing point by a plurality of user equipments within a cell. In more detail, the PUCCH resources used for ACK/NACK transmission by the user equipment correspond to PDCCH carrying scheduling information of corresponding downlink data. In each downlink subframe, an entire region where the PDCCH is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 8, each square block in a downlink represents a CCE, and each square block in an uplink represents a PUCCH resource. Each PUCCH index corresponds to a PUCCH resource for ACK/NACK. It is assumed that PDSCH information is transferred through a PDCCH that includes CCEs Nos. 4 to 6 as illustrated in FIG. 8. In this case, the user equipment transmits ACK/NACK through PUCCH No. 4 corresponding to CCE No. 4 which is the first CCE of the PDCCH. FIG. 8 illustrates that maximum M number of PUCCHs exist in the uplink (UL) when maximum N number of CCEs exist in the downlink (DL). Although N may be equal to M (N=M), M may be designed to differ from N, and mapping between CCEs and PUCCHs may be overlapped.

In more detail, in the LTE system, the PUCCH resource index is defined as follows.

$$n^{(1)}_{PUCCH} = n_{CCE} + N^{(1)}_{PUCCH}$$ [Equation 1]

In this case, $n^{(1)}_{PUCCH}$ represents a PUCCH resource index for transmitting ACK/NACK, $N^{(1)}_{PUCCH}$ represents a signaling value transferred from an upper layer, and $n_{CCE}$ represents the smallest value of CCE indexes used for PDCCH transmission.

As expressed by the Equation 1, the PUCCH index for ACK/NACK transmission is determined in accordance with the first CCE for PDCCH transmission. Then, resource block (RB) index for PUCCH transmission, orthogonal cover index and cyclic shift value are determined using the PUCCH index. Since the base station reserves the PUCCH resource as much as the number of CCEs used for PDCCH transmission, if the CCEs used for PDCCH transmission are two or more, the PUCCH index mapped into the other CCEs except for the first CCE is not used for PUCCH transmission.

Figure 9:
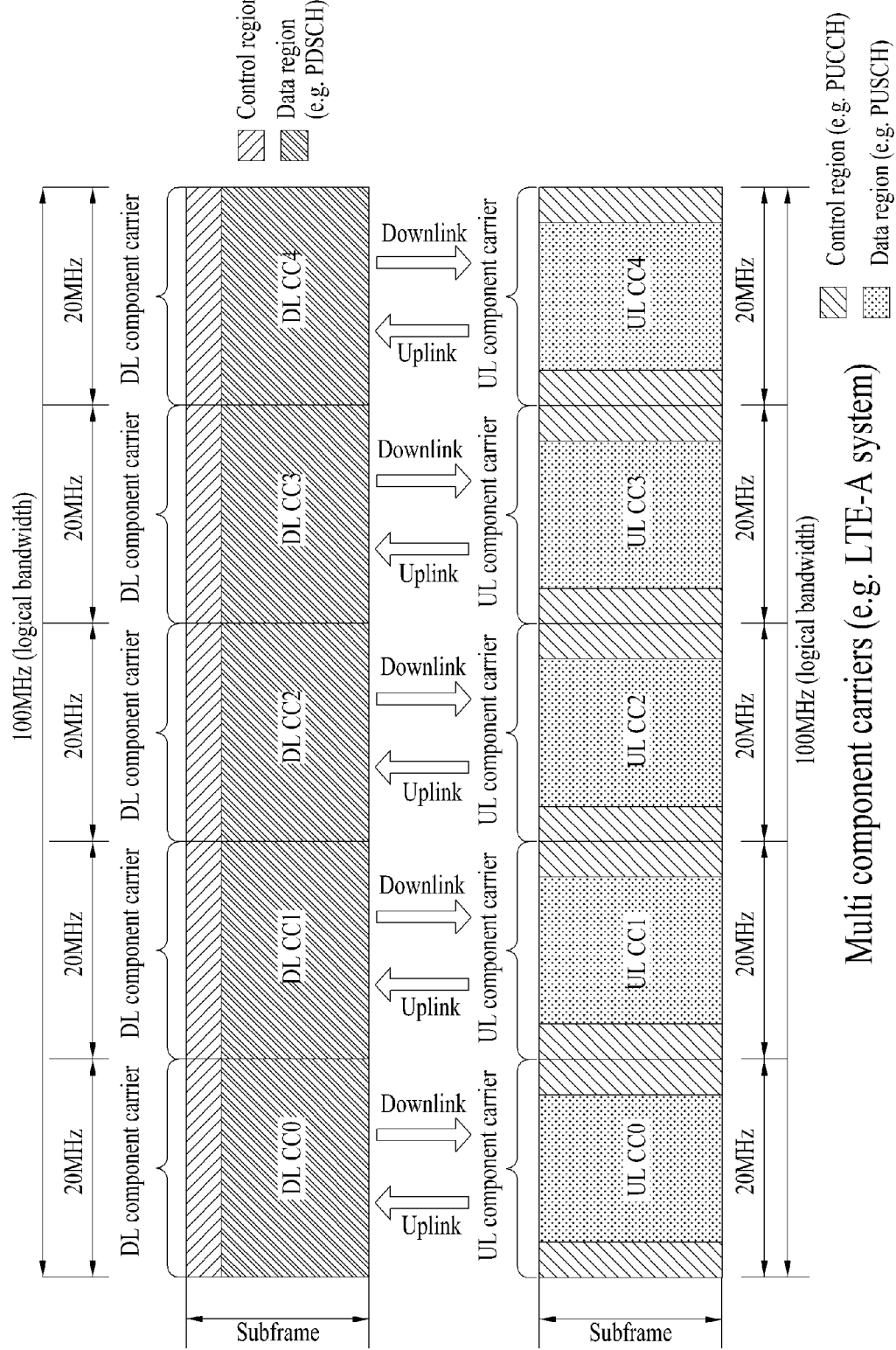
FIG. 9 is a diagram illustrating an example of communication performed under multiple component carriers.

FIG. 9 is a diagram illustrating an example of communication performed under multiple component carriers.

FIG. 9 may correspond to a communication example of the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC). In this specification, the component carrier may mean a frequency block for carrier aggregation or a central carrier of the frequency block depending on the context. The frequency block for carrier aggregation and the central carrier of the frequency block may be used together.

Referring to FIG. 9, five component carriers (CCs) of 20 MHz are collected in the uplink/downlink to support a bandwidth of 100 MHz. The respective component carriers may adjoin each other in the frequency domain or not. For convenience, FIG. 9 illustrates that a bandwidth of each uplink component carrier is the same as and symmetrical to that of each downlink component carrier. However, the bandwidths of the respective component carriers may be defined independently. For example, the bandwidths of the uplink component carriers may be configured as 5 MHz (UL CC0)+20 MHz (UL CC1)+20 MHz (UL CC2)+20 MHz (UL CC3)+5 MHz (UL CC4). Also, asymmetrical carrier aggregation where the number of uplink component carriers is different from the number of downlink component carriers may be configured.

The asymmetrical carrier aggregation may occur due to a limit of available frequency bandwidth, or may be configured artificially by network configuration. For example, even though N number of CCs are configured in the entire system band, a frequency band that can be received by a specific user equipment may be limited to M(<N) number of CCs. Various parameters for carrier aggregation may be set cell-specifically, UE group-specifically or UE-specifically.

Also, although FIG. 9 illustrates that an uplink signal and a downlink signal are transmitted through component carriers mapped with each other one to one, the component carrier through which a signal is actually transmitted may be varied depending on network configuration or signal type. For example, if a scheduling command is downlink-transmitted through the DL CC1, the data based on the scheduling command may be performed through another DL CC or UL CC. Also, control information related to the DL CC may be uplink-transmitted through a specific UL CC regardless of mapping between the component carriers. Similarly, downlink control information may be transmitted through a specific DL CC.

A Tx node may transmit a plurality of data units to an Rx node within a given physical resource, and the Rx node may transmit a plurality of corresponding ACK/NACK signals within the given physical resource. The physical resource includes frequency, time, space, code or their random combination. For description of the present invention, it is assumed that the Rx node transmits ACK/NACK corresponding to each data unit through unit ACK/NACK resource. For convenience, the unit ACK/NACK resource will simply be referred to as ACK/NACK. For example, the ACK/NACK unit includes a PUCCH resource for ACK/NACK transmission. Meanwhile, the number of ACK/NACK signals to be transmitted through one UL subframe may be increased for some reasons (for example, asynchronous carrier aggregation, TDD mode, relay backhaul link, etc.) In this case, since the Rx node transmits ACK/NACK signals through a plurality of ACK/NACK units, ACK/NACK transmission and reception may be complicated and the total ACK/NACK transmission power may be increased. In order to prevent a large number of ACK/NACK signals from being transmitted through the plurality of ACK/NACK units and reduce the total ACK/NACK transmission power, the following methods may be considered.

1) ACK/NACK Bundling

In ACK/NACK bundling, ACK/NACK responses to a plurality of data units are combined with one another by logical-AND operation. For example, the Rx node transmits ACK signal by using one ACK/NACK unit if all the data units are successfully decoded. On the other hand, the Rx node transmits NACK signal by using one ACK/NACK unit or does not transmit any signal if decoding (or detection) is failed even in any one of the data units.

2) ACK/NACK Multiplexing

In ACK/NACK multiplexing, ACK/NACK responses to a plurality of data units are identified by combination of ACK/NACK unit used for actual ACK/NACK transmission and the transmitted ACK/NACK message. For example, it is assumed that the ACK/NACK unit carries two bits and maximum two data units are transmitted. In other words, we assume that HARQ operation for each data unit can be managed by a single ACK/NACK bit. In this case, the ACK/NACK result may be identified by the Tx node as expressed by Table 2.

TABLE 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 2, HARQ-ACK(i) represents the ACK/NACK result for the data unit i. DTX (Discontinuous Transmission) represents that there are no data transmitted for the corresponding HARQ-ACK(i) or the Rx node fails to detect the data unit corresponding to HARQ-ACK(i). NACK/DTX represents that NACK and DTX are coupled with each other. In other words, NACK/DTX represents the ACK/NACK result is NACK or DTX only. n(1)PUCCH, X represents ACK/NACK unit to be used for actual ACK/NACK transmission, and maximum two ACK/NACK units (that is, n(1)PUCCH,0 and n(1)PUCCH,1) exist. b(0),b(1) represent two bits carried by the selected ACK/NACK unit. For example, if the Rx node receives two data units and successfully decodes them, it transmits two bits (1,1) by using the ACK/NACK unit n(1)PUCCH,1. Although the Tx node has transmitted two data units, if the Rx node fails to decode the first data unit (corresponding to HARQ-ACK(0)) and successfully decodes the second data unit (corresponding to HARQ-ACK(1)), it transmits (1,0) by using n(1)PUCCH,1. In this way, actual ACK/NACK message may be connected with combination of ACK/NACK unit selection and the bit value in the ACK/NACK unit, whereby ACK/NACK transmission for the plurality of data units may be performed using one ACK/NACK unit. Examples illustrated in Table 1 may be extended for ACK/NACK transmission for three or more data units.

If the maximum number of data units that can be transmitted through a given physical resource is great, ACK/NACK bundling or ACK/NACK multiplexing applied to all the data units may cause considerable complexity and/or complicated error status. Accordingly, if the maximum number of data units is great, restriction or combination of ACK/NACK transmission scheme is required. Hereinafter, ACK/NACK transmission scheme according to the embodiment of the present invention will be described with reference to the accompanying drawings.

In this case, the ACK/NACK state represents ACK or NACK state for each data unit. Additionally, the ACK/NACK state (result or response) may represent DTX or NACK/DTX. The ACK/NACK state may include a single bit or a plurality of bits on the basis of Spatial Division Multiple Access (SDMA) transmission, for example.

In the mean time, in this specification, the ACK/NACK signal represents a physical signal transmitted through a physical channel. Unless mentioned specifically, in this specification, the ACK/NACK state, the ACK/NACK result or the ACK/NACK signal may simply be referred to as ACK/NACK and may be used together depending on the context.

In this case, a transport channel for ACK/NACK transmission is based on code-division multiplexing such as PUCCH format 1 series used in the current LTE/LTE-A system, peak-to-average power ratio/cubic metric (PAPR/CM) characteristics may be reduced due to multiple transport channels.

Moreover, in the LTE-A system, as the user equipment uses multiple CCs from a downlink component carrier (DL CC) or uplink component carrier (UL CC), system bandwidth extension has been required. However, the LTE-A user equipment should transmit multiple feedback information together with aggregated carriers as compared with feedback information transmitted from the existing LTE user equipment, and the number of ACK/NACK states for acknowledgement based on usage of multiple carriers has been increased.

For example, if N DL CCs used for downlink traffic transmission exist, the user equipment needs to respond to each DL CC by using N ACK/NACK signals, and an uplink control channel corresponding to a feedback information rate required to transmit the ACK/NACK signals should exist.

However, in the existing legacy control channel structure, since the increased ACK/NACK signal transmission cannot be satisfied by a feedback information rate based on a single control channel structure, required control channel resource regions may be increased and resource consumption used for ACK/NACK feedback transmission may be increased, whereby resource waste may be caused.

Accordingly, studies on a method for efficiently transmitting ACK/NACK signal from a user equipment of an LTE-A system are ongoing. For example, a feedback information rate such as ACK/NACK signal may be minimized in a unit of subframe such that too many uplink control channels or control information spaces may not be required in a unit of subframe.

An example of a method for efficiently transmitting ACK/NACK signal from a receiver of an LTE-A system may include a method for dividing a feedback information rate into group unit information in accordance with one embodiment of the present invention. For example, if the number of ACK/NACK bits to be fed back from the user equipment is N(N>==1), N bits may be grouped into M(M>==1) ACK/NACK groups, and the number of ACK/NACK bits allocated to each group may be the same or not the same as one another.

Alternatively, an example of a method for efficiently transmitting ACK/NACK signal from a receiver of an LTE-A system may include a method for reducing a feedback information rate by reducing ACK/NACK states in accordance with another embodiment of the present invention. At this time, reduction of the ACK/NACK states may be applied to each group independently or may be joined to each group in accordance with a transmission mode.

Hereinafter, in this specification, the aforementioned 'ACK/NACK state' represents the result of acknowledgement for the data unit (for example, codeword), and includes ACK, NACK or DTX. ACK represents that the received codeword has no error, NACK represents that the received codeword has an error, and DTX means that the receiver fails to recognize that the data unit has been transmitted from the transmitter.

1. First Embodiment

ACK/NACK State Reduction

The method for efficiently transmitting ACK/NACK signal in accordance with the embodiments of the present invention may be used for a MIMO transmission mode where multiple codewords are transmitted at the same time.

If multiple codewords are used for the MIMO transmission mode, combination of ACK/NACK/DTX indicating acknowledgement of the multiple codewords may be expressed by one state from feedback information. Moreover, if multiple carriers are used for burst traffic transmission, ACK/NACK/DTX combination may be expressed by a pow function that includes three components. In other words, the ACK/NACK state may be expressed in a type of pow(3, $N_m*N_c$)1*3, wherein $N_m$ means the number of codewords in a unit of carrier, $N_c$ means the number of used carriers, and pow(a, b) represents $a^b$.

However, if the existing ACK/NACK state is used for the MIMO transmission mode, the ACK/NACK state may be represented by three states of {{ACK}, {NACK}, {DTX}} or two states of {{ACK}, {NACK/DTX} } for single codeword transmission. For another example, the ACK/NACK state for two codewords may be represented by five states of {{ACK, ACK}, {ACK, NACK}, {NACK, ACK}, {NACK, NACK}, {DTX}}. Then, if data are received through Nc CCs, all the ACK/NACK states that can be used by ACK/NACK feedback information may become pow(3, Nc) for single codeword transmission and pow(5, Nc) for transmission of two codewords. Accordingly, if transmission of Nm codewords can be performed for each of component carriers, the basic number of ACK/NACK states may be generalized by pow(2*Nm)+1, Nc).

In the mean time, the PUCCH format 1 provides information space of five states in a unit of resource element. Accordingly, if the number of codewords in a unit of carrier is (Nm<=2), a single PUCCH resource may be used for feedback transmission for the codeword received through a single carrier. One of methods for extending PUCCH resources in accordance with increase of feedback information is to use Nc PUCCH resources for uplink control feedback. As Nc PUCCH resources are reserved and at the same time Nc PUCCHs are transmitted, combination of all the ACK/NACK states may be fed back.

However, multiple PUCCH transmission may deteriorate PAPR/CM indicating system throughput as described above, and may reduce uplink cell coverage.

Accordingly, it is general that one PUCCH is transmitted in a unit of transmitting antenna or power amplifier. In this case, the number of information spaces available in the limited PUCCH resource is proportional to the number Nc of used carriers. This means that the number of feedback information should be reduced to be limited to a certain number of PUCCH resources even though more PUCCH resources are used to satisfy the same number of ACK/NACK bits or only one PUCCH is allocated to an antenna or power amplifier.

Hereinafter, a method for reducing a feedback information rate by reducing ACK/NACK states in accordance with one embodiment of the present invention will be described.

As an example of a method for reducing feedback information, feedback information message may be compressed within the range that system operation is not limited. If ACK/NACK is fed back and ACK/NACK states configured by combination in accordance with a plurality of codewords satisfy a given condition, they may be configured by a single state of one ACK or NACK. For example, if the probability of the occurrence of NACK is p, the probability of NACK event may be expressed by the following Equation 2.

$$P(k)=NchooseK(Nm*Nc,k)(1-p)^{\wedge}(Nm*Nc-k)*p^{\wedge}k \quad \text{[Equation 2]}$$

In this case, Nm represents the number of codewords, Nc represents the number of aggregated carriers, k represents the number of NACKs of ACKs/NACKs for a plurality of codewords constituting Nc carriers, and NchooseK(a,b) =aCb is obtained. If p is the probability of the occurrence of NACK, (1−p) represents the probability of the occurrence of ACK.

In the above Equation 2, it is assumed that Nm=2, Nc=4, and p=0.1. In this case, P(k) indicating the probability of NACK event may have values distributed as expressed by the following Table 3.

TABLE 3

| P(k) = NchooseK(Nm * Nc, k)(1 − p)^(Nm * Nc − k) * p^k, (assume Nm = 2, Nc = 4, p = 0.1) | |
|---|---|
| P(k = 0) = 0.43047 | P(k = 0) = 0.43047 |
| P(k = 2) = 0.1488 | P(k = 2) = 0.1488 |
| P(k = 4) = 0.0045927 | P(k = 4) = 0.0045927 |
| P(k = 6) = 2.268e−005 | P(k = 6) = 2.268e−005 |
| P(k = 8) = 1e−008 | P(k = 8) = 1e−008 |

Referring to Table 3, among the distributed values of P(k) indicating the probability of NACK event, it is noted that the probability of one ACK/NACK state including a certain number of NACKs has a very small value that can be disregarded as compared with the probability of other state. For example, the ACK/NACK state corresponding to P(k) less than 4% may be represented by single NACK regardless of the number of codewords corresponding to the corresponding ACK/NACK state, or may not include a separate ACK signal. In other words, in Table 3, the state of P(k>=5) may be disregarded. Accordingly, the ACK/NACK state may be compressed more simply.

Figure 10:
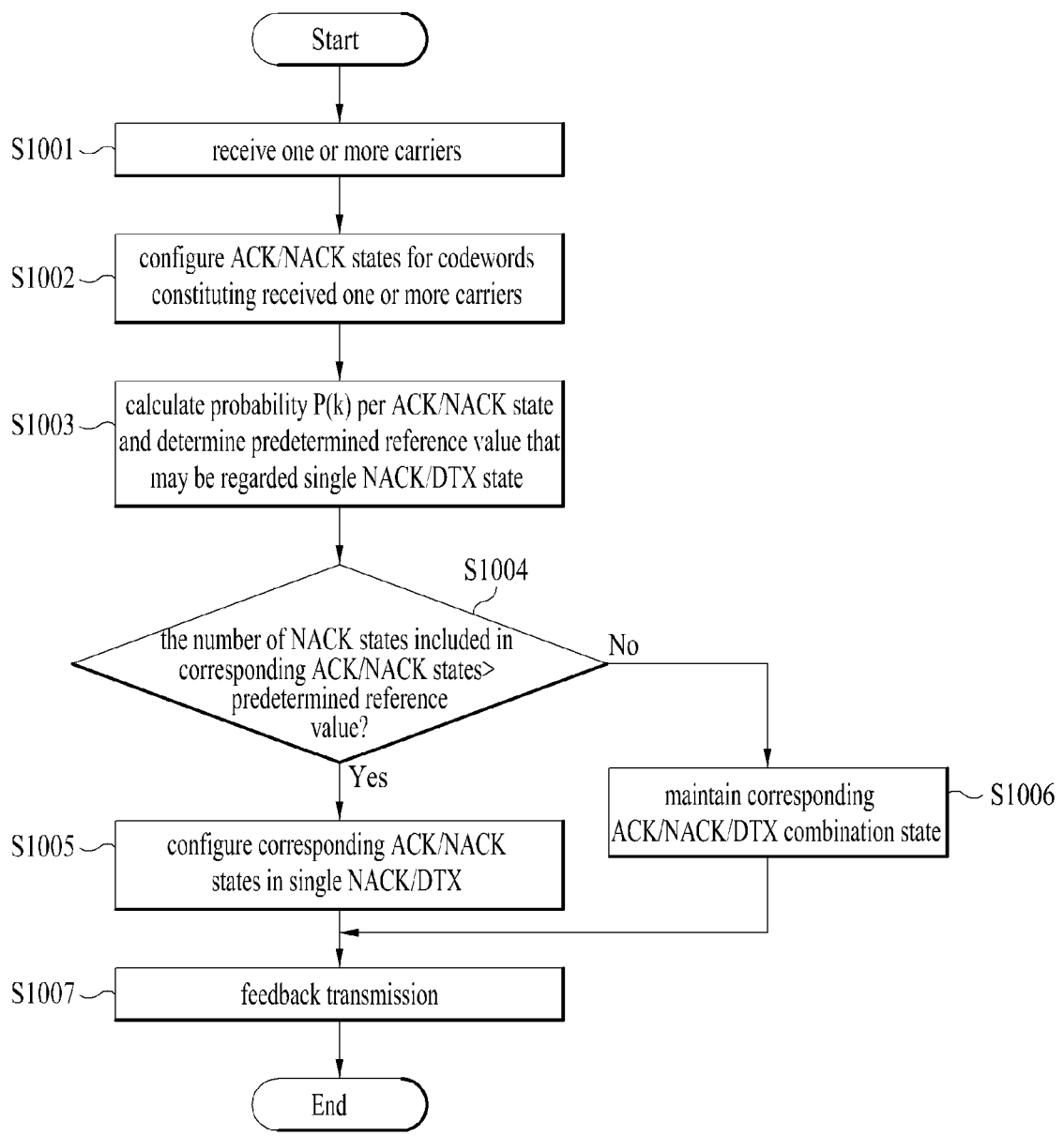
FIG. 10 is a flow chart illustrating an example of a procedure of transmitting feedback information by determining ACK/NACK state in accordance with one embodiment of the present invention.

FIG. 10 is a flow chart illustrating an example of a procedure of transmitting feedback information by determining ACK/NACK state in accordance with one embodiment of the present invention.

Referring to FIG. 10, the user equipment receives one or more carriers, which include one or more codewords, from the base station (S1001).

The user equipment configures entire ACK/NACK states by calculating ACK/NACK for a certain number of codewords by using the number Nc of used carriers and the number Nm of codewords per received carrier (S1002).

As described above, the ACK/NACK state represents a specific state configured by combination of ACK/NACK/DTX for each of a plurality of codewords. The number of entire ACK/NACK states for one or more codewords may be configured in various manners in accordance with Nm*Nc. In this case, each ACK/NACK state may be configured by combination of the received results (ACK/NACK/DTX) for each codeword.

Next, the user equipment determines a predetermined reference value that can regard the state of ACK/NACK combination as one NACK or DTX by obtaining the probability P(k) of the occurrence of each ACK/NACK state of combination of ACK/NACK/DTX for Nm*Nc (S1003).

At this time, the probability of the occurrence of ACK/NACK state may be calculated busing the Equation 1. A predetermined value for regarding the state represented by combination of {ACK, NACK, DTX} as NACK or DTX may be set to a certain numbered probability value from the uppermost in a probability distribution of the entire states that may occur, by considering bits allocated for feedback transmission from the uplink. If the presence probability of the ACK/NACK state comprised of ACK/NACK/DTX for each codeword is less than a certain reference, the number of NACKs that may be included in one ACK/NACK state is determined using a predetermined value, wherein the one ACK/NACK state may regard the ACK/NACK state comprised of combination of ACK/NACK/DTX as NACK or DTX of a single state.

A simplified ACK/NACK state is configured using the predetermined value determined at the step S1003 for the ACK/NACK states configured at the step S1002 (S1004 to S1006). If the number of NACKs included in the ACK/NACK/DTX combination state constituting one ACK/NACK is more than the reference value, the corresponding ACK/NACK state is configured by single NACK/DTX (S1005). On the other hand, if the number of NACKs included in the corresponding ACK/NACK state is less than the reference value, the corresponding ACK/NACK state is maintained as it is, whereby multiple ACK/NACK states are transmitted (S1006). An example of the multiple ACK/NACK states or the single ACK/NACK state is illustrated in Table 4.

The ACK/NACK state configured as above is fed back to the base station (S1007). At this time, as the number of ACK/NACK states that may be configured per the number of corresponding codewords is reduced, PUCCH resources required to transmit control information such as ACK/NACK may be reduced.

If the ACK/NACK states are reduced in accordance with FIG. 10, they may be configured as illustrated in Table 4.

Table 4 illustrates an example of ACK/NACK state configured in accordance with codewords belonging to a carrier according to one embodiment of the present invention.

TABLE 4

| Nm * Nc | Reference value of the number of N/D | The number of N/D states | Available ACK/NACK states (A = ack, N = NACK, D = DTX, S = Special, / = or) |
|---|---|---|---|
| 1 | N/A | 3 | ACK(A), NACK(N), DTX(D) |
| 2 | N/A | 5 | {A, A}, {A, N/D}, {N/D, A}, {N, N}, D |
| 3 | 2 | 5 or 9 | {A, A, A}, {A, A, N/D}, {A, N/D, A}, {N/D, A, A}, N/D |
| 4 | 2 | 6~9 | {A, A, A, A}, {A, A, A, N/D}, {A, A, N/D, A}, {A, N/D, A, A}, {N/D, A, A, A}, N/D, S1, S2, S3 |
| 5 | 2 | 7~9 | {A, A, A, A, A}, {A, A, A, A, N/D}, {A, A, A, N/D, A} {A, A, N/D, A, A}, {A, N/D, A, A, A}, {N/D, A, A, A, A}, N/D, S1, S2 |
| ... | ... | ... | ... |

Table 4 is an example for description of a method for reducing ACK/NACK states according to one embodiment of the present invention. In Table 4, the number of states and reference values for NACK or DTX are only exemplary, and thus are not limited to examples of Table 4.

In Table 4, incase of Nm*Nc=3, ACK/NACK states for three codewords may be represented by nine states of {{A,A,A},{A,A,N/D},{A,N/D,A},{N/D,A,A},{A,N/D,N/D}, {N/D,A,N/D},{N/D,N/D,A},{N,N,N},N/D}. At this time, if a reference value that may be regarded as one NACK or DTX is determined as 2, the ACK/NACK states, which include two or more N/D, among a total of nine ACK/NACK states, may be regarded as single states of N/D. Accordingly, the ACK/NACK states for three codewords may be reduced to five of {A,A,N/D},{A,N/D,A},{N/D,A,A},N/D}. In other words, the number of ACK/NACK states may be varied depending on the reference value for regarding N/D and the number of codewords.

In Table 4, 'S' represents a special state that may be used for special feedback information. For example, if user equipment-specific, cell-specific and carrier-specific traffic, which may be defined independently, are transmitted, corresponding ACK/NACK information may be defined to be represented by the state 'S' regardless of other ACK/NACK information. This situation occurs when primary carrier/anchor carrier/reference carrier traffic are scheduled. Then, if the user equipment receives the corresponding carrier and successfully decodes the received carrier (that is, if ACK transmission is definite), it may report the state on ACK/NACK information related to a specific carrier or traffic included in the corresponding carrier.

The special state corresponding to special feedback information may be represented by one or more states (for example, S1, S2, . . . ), and may be defined as multiple state corresponding to multiple information or multiple specific carrier/traffic information. If the special state is used, link connection may be maintained even if there is no reliability in other carrier traffic.

In order to uniformly maintain a transmission type of ACK/NACK transmitted through the PUCCH, it is preferable that the special state is mapped into the PUCCH format used for ACK/NACK transmission. For example, if Nr PUCCH resources are used for PUCCH transmission, the special state may be mapped into a specific PUCCH (for example, the lowest PUCCH index or legacy PUCCH index based on the lowest CCE of the first PUCCH resource or PUCCH index in view of resource allocation). Then, the same resource and state may indicate the same feedback information regardless of the number of allocated resources.

2. Second Embodiment

ACK/NACK Bundling Depending on Carrier Type

Generally, when multiple carriers are aggregated, a plurality of component carriers may have their respective features. For example, among a plurality of component carriers (CCs), some CC may be used for system information transmission, and another CC may be used to receive a specific command from the base station, and the other CC may be used for data traffic transmission only. Alternatively, there may be CC used to transmit additional information for primary CC for better quality of service (QoS). The CCs include stand-alone carriers, backward compatible carriers, non-backward compatible carriers and extension carriers depending on their type.

In more detail, carriers, which may allow a random cell, base station or user equipment on a relay node to independently perform a procedure for basic access, cell search and system information transmission through definition of the same physical channel and physical signal as those of the LTE Rel-8 carriers, may be defined as the stand-alone carriers. In this case, the stand-alone carriers include the backward compatible carriers and the non-backward compatible carriers as described above.

The backward compatible carriers are carriers for supporting the existing legacy system, and may be defined as the carrier that may be accessed by the LTE user equipment. The backward compatible carriers may be operated as a part of carrier aggregation or single carrier, and always exist in pairs (for example, uplink and downlink) in the FDD mode.

The non-backward carriers are those that may not be accessed by the user equipment belonging to the existing legacy system. In other words, the non-backward carriers may be carriers that may not be used through compatibility between the legacy system and the current system. The non-backward carriers may be operated as single carriers if non-compatibility between the existing system and the current system is caused by duplex distance. The non-backward carriers may be operated as a part of carrier aggregation if not so.

The extension carriers may not be operated independently, and may be defined as those used for bandwidth extension only. Unlike the stand-alone carriers, the extension carriers may be regarded as those having non-stand-alone features that do not support the aforementioned procedures (i.e., at least a part of basic access, cell search and system information transmission).

Moreover, the carrier type may be classified into primary carriers/anchor carriers/reference carriers and secondary carriers. Among the carriers, a special CC related with that the user equipment thoroughly reports feedback information on the carriers to the base station may be defined.

In the method for efficiently transmitting feedback information in accordance with another embodiment of the present invention, the feedback information is divided into special information and normal feedback information, and downlink component carriers (DL CCs) used to transmit each information are grouped into a plurality of groups and subjected to bundling or joint coding as one type of feedback information.

Figure 11:
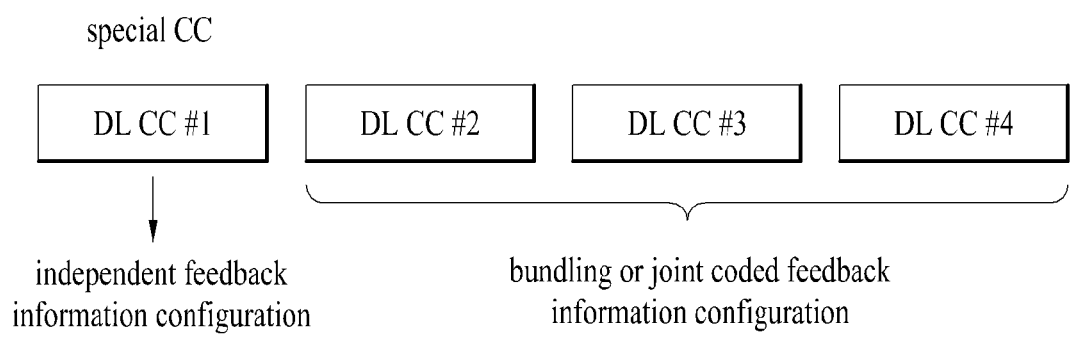
FIG. 11 is a diagram illustrating an example of a plurality of downlink carriers aggregated for feedback information transmission according to another embodiment of the present invention.

FIG. 11 is a diagram illustrating an example of a plurality of downlink carriers aggregated for feedback information transmission according to another embodiment of the present invention.

Referring to FIG. 11, when four DL CCs are configured in accordance with carrier aggregation, one (for example, DL CC1) of the four DL CCs may be set to specific CC differentiated from other DL CC used for general data transmission. Grouped data included in the DL CC1 corresponding to the specific CC are differentiated from grouped data transmitted through DL CC2 to DL CC4 corresponding to another type DL CC, whereby separate feedback information may be generated. In other words, feedback information for the special CC may be configured by ACK/NACK state for each codeword transmitted through the special CC. At this time, the feedback information for the special CC may be configured as one or more dedicated states independently from the other DL CCs.

Data transmitted through the other three DL CCs (for example, DL CC2 to DL CC4) may be grouped through bundling or joint coding as one feedback information during transmission of general feedback information such as ACK/NACK feedback information.

FIG. 11 is an example for description of grouping of feedback information according to one embodiment of the present invention. The special CC and the number of the other CCs may be configured differently from FIG. 11.

Figure 12:
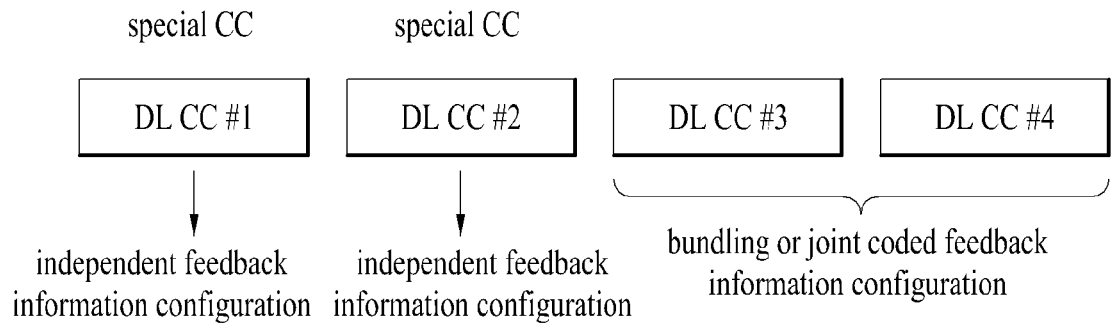
FIG. 12 is a diagram illustrating another example of a plurality of downlink carriers aggregated for feedback information transmission according to another embodiment of the present invention.
Figure 13:
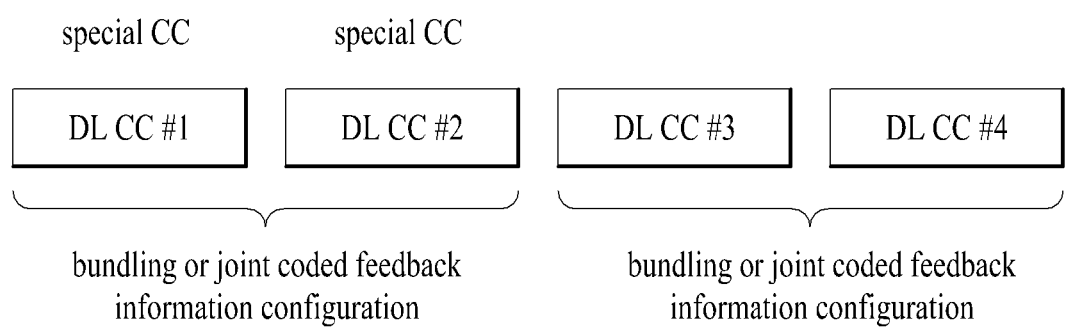
FIG. 13 is a diagram illustrating other example of a plurality of downlink carriers aggregated for feedback information transmission according to another embodiment of the present invention.

FIG. 12 and FIG. 13 are diagrams illustrating other examples of a plurality of downlink carriers aggregated for feedback information transmission according to another embodiment of the present invention.

Referring to FIG. 12, the DL CC for transmitting special information is differentiated from DL CC for transmitting generally grouped data in the same manner as FIG. 11, whereby DL CC1 and DL CC2 may be allocated to the special CC.

Likewise, ACK/NACK signals for codewords transmitted through each DL CC may be configured, and feedback information may be grouped in such a manner that special information may be differentiated from general data. Feedback information that includes ACK/NACK corresponding to DL CC3 and DL CC4 may be subjected to bundling or joint coding, whereby the feedback information rate may be reduced. The DL CC1 and the DL CC2 corresponding to the special CCs may be configured in such a manner that their respective feedback information may be transmitted independently.

Unlike FIG. 12, bundling or joint coding may be applied to the special information, whereby the feedback information rate may be reduced, as shown in FIG. 13. In other words, bundling or joint coding may be performed for the DL CC1 and the DL CC2 corresponding to the special CCs.

As described above, the bundled feedback information such as ACK/NACK in accordance with the aforementioned embodiments described with reference to FIG. 11 to FIG. 13 may be aggregated as one ACK/NACK state or two ACK/NACK states in accordance with a MIMO transmission mode (for example, the number of codewords).

In the mean time, bundling may be defined as the reduced feedback information state, and the reduced feedback information may be defined as a part of all the available states in spite of the grouped DL CCs, whereby the number of requested states may be reduced as illustrated in Table 4 or Table 5 below.

3. Third Embodiment

The Number of ACK/NACK States

According to still another embodiment of the present invention, a total number of feedback states for respective carriers are configured equally regardless of the number of aggregated carriers.

If the number of available states in one PUCCH is Ns, the number of feedback information states may be equal to or smaller than Ns. For example, if the number of available states in Nc PUCCH resources is Ns', channel selection may be performed such that the number of feedback information states is less than Ns'.

Accordingly, the number of states based on carrier aggregation may be defined based on the number of used PUCCHs. For example, if one legacy PUCCH resource is used, three or five states may be represented by ACK/NACK feedback that includes DTX. For another example, if two legacy PUCCH resources are used for resource selection, maximum nine states including DTX may be represented. Accordingly, in order to use the same PUCCH resource allocation mode regardless of carrier aggregation level, the method for reducing the feedback information state may be defined in such a manner that the number of feedback states for carrier aggregation is the same as the number of used PUCCH resources.

Table 5 illustrates another example of ACK/NACK states configured in accordance with codewords belonging to the carriers according to one embodiment of the present invention. In Table 5, a state used for feedback information transmission includes a special state, and the number of available states per PUCCH is fixed.

TABLE 5

| The number of CCs | First PUCCH (fixed to five states) | Second PUCCH (fixed nine states) |
|---|---|---|
| 1 | A, N, D, S1, S2 | A, N, DTX, S1, S2, S3, S4, S5, S6 |
| 2 | {A, A}, {A, N/D}, {N/D, A}, {N, N}, D | {A, A}, {A, N}, {N, A}, {N, N}, {A, D}, {D, A}, D, S1, S2 |
| 3 | {A, A, A}, {A, A, N/D}, {A, N/D, A}, {N/D, A, A}, N/D | Embodiment 1) {A, A, A}, {A, A, N}, {A, N, A}, {N, A, A}, {A, A, D}, {A, D, A}, {D, A, A}, N, D Embodiment 2) {A, A, A}, {A, A, N/D}, {A, N/D, A}, {N/D, A, A,}, N, D, S1, S2, S3 |
| 4 | {A, A, A, A}, {A, A, A, N/D}, {A, A, N/D, A/N/D}, {A, N/D, A/N/D, A/N/D}, N/D | {A, A, A, A}, {A, A, A, N/D}, {A, A, N/D, A}, {A, N/D, A, A, A}, {N/D, A,A, A}, N, D, S1, S2 |
| 5 | {A, A, A, A, A}, {A, A, A, A, N/D}, {A, A, N/D, A/N/D, A/N/D}, {A, N/D, A/N/D, A/N/D, A/N/D}, N/D | {A, A, A, A, A}, {A, A, A, A, N/D}, {A, A, A, N/D, A}, {A, A, N/D, A, A}, {A, N/D, A, A, A}, {N/D, A, A, A, A}, N, D, S |

Referring to Table 5, it is noted that one PUCCH may be used and two or more PUCCHs may be used.

For example, in case of the legacy mode, a feedback information transmission mode based on one PUCCH may be used in a single carrier mode as the feedback information transmission mode used in the legacy system. If one PUCCH is used, spaces for uplink data transmission may be defined as maximum five.

However, if carrier aggregation is performed in the LTE-A system, states required for feedback information transmission are beyond the range of single PUCCH performance. In order to prevent this situation from occurring, it is assumed that two PUCCHs are configured in accordance with still another embodiment of the present invention. In this case, maximum nine ACK/NACK states may be configured regardless of the number of CCs illustrated in Table 5.

As a result, as the number of states for feedback transmission is simplified as compared with the related art, feedback information that satisfies control channel performance may be configured in the LTE/LTE-A system.

In Table 5, the special state (S) may be used for a specific usage such as specific feedback information transmission or may not be used in a useful state. In other words, if the special state is used for specific function or specific feedback information transmission, it becomes a useful state and then may be used by the user equipment. If not so, the special state may be disregarded and may be processed in a invalid state.

4. Fourth Embodiment

Feedback Information in MIMO Extension

In a system that uses MIMO transmitting antennas, MIMO transmitting antennas may be used to transmit an uplink signal through the PUCCH.

At this time, feedback information according to the embodiments of the present invention may be configured differently depending on a symbol transmitted per antenna.

First of all, an example that the MIMO transmitting antennas transmit the same symbol will be described. For example, if PUCCH modulation for the MIMO transmitting antennas is configured in the same modulation mode and the same control information is transmitted through each transmitting antenna, the MIMO transmitting antennas may be used for a special diversity mode. As a result, different PUCCH resources on each transmitting antenna may be used as orthogonal transmission resources for identifying channels of a pair of transmitting-receiving antennas from each other.

Second, an example that symbols transmitted per MIMO antenna are configured differently will be described. If other control information or joint coded information symbols are transmitted per transmitting antenna, each of the control information may be transmitted through different PUCCH resources and may be transmitted independently for the transmitting antennas.

In other words, if the number of codewords is more than one, feedback information of each of the codewords may be mapped into different transmitting antennas.

The feedback information may be classified depending on a carrier type on the basis of the component carriers. In other words, feedback information for each carrier may be mapped into its respective transmitting antenna that uses an antenna-specific PUCCH resource.

As described above, the base station and the user equipment through which the embodiments of the present invention can be carried out will be described with reference to FIG. 14.

Figure 14:
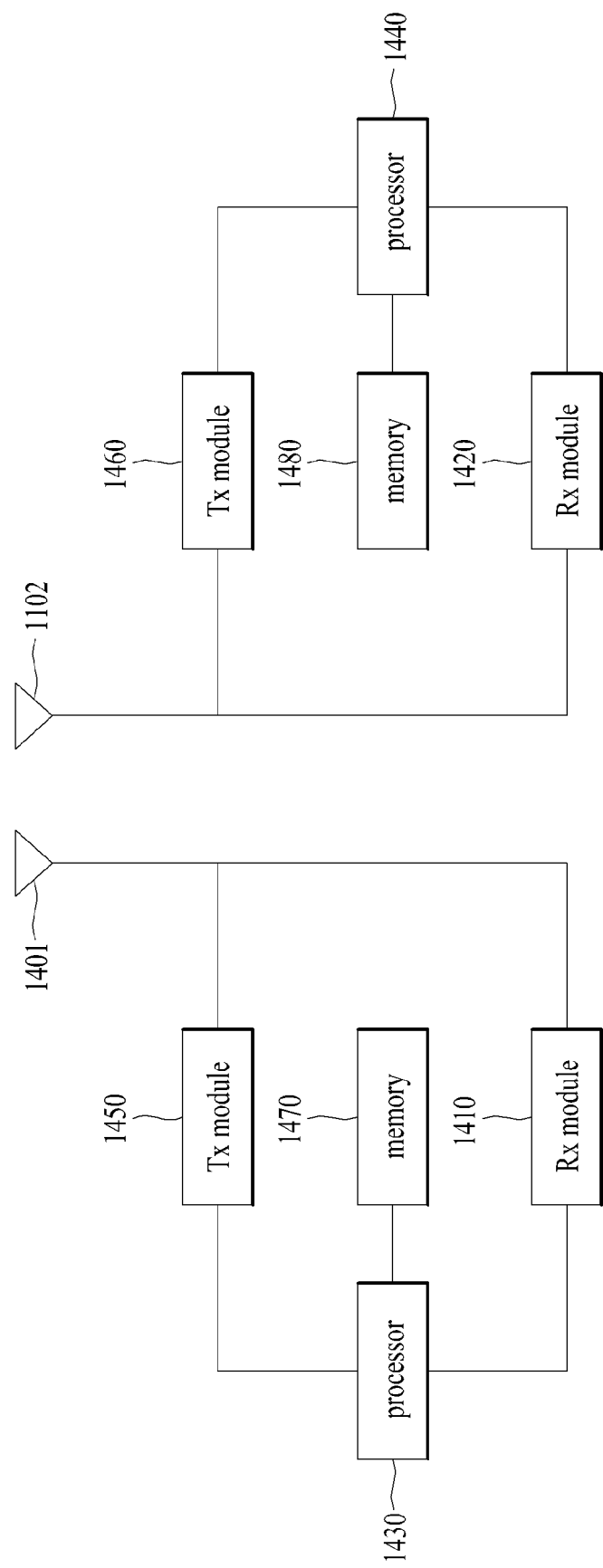
FIG. 14 is a diagram illustrating a base station and a user equipment, through which the embodiments of the present invention can be carried out.

FIG. 14 is a block diagram illustrating a base station and a user equipment, through which the embodiments of the present invention can be carried out.

The user equipment may be operated as a transmitter on an uplink and as a receiver on a downlink. Also, the base station ABS may be operated as a receiver on the uplink and as a transmitter on the downlink. In other words, each of the user equipment and the base station may include a transmitter and a receiver for transmission of information or data.

The transmitter and the receiver may include a processor, modules, parts, and/or means for implementing the embodiments of the present invention. Especially, the transmitter and the receiver may include a module (means) for encrypting messages, a module for interpreting encrypted messages, an antenna for transmitting and receiving messages, etc.

Referring to FIG. 14, the left part corresponds to a structure of the transmitter, and the right part corresponds to a structure of the receiver and represents the user equipment that enters a cell served by the base station. Each of the transmitter and the receiver may include an antenna 1401 or 1402, a Reception (Rx) module 1410 or 1420, a processor 1430 or 1440, a Transmission (Tx) module 1450 or 146, and a memory 1470 or 1480.

The antenna 1401 or 1402 includes a receiving antenna receiving radio frequency (RF) signals and transferring the RF signals to the Rx module 1410 or 1420 and a transmitting antenna transmitting the signals generated from the Tx module 1450 or 1460 to the outside. If a Multiple Input Multiple Output (MIMO) function is supported, two or more antennas may be provided.

The Rx module 1410 or 1420 may perform predetermined coding and demodulation for the RF signals externally received through the antenna to recover original data and then transfer the recovered data to the processor 1430 or 1440. The Rx module and the antenna may be incorporated into a receiving portion for receiving the RF signal unlike FIG. 12.

The processor 1430 or 1440 generally controls the overall operation of the transmitter or the receiver. In particular, the processor 1430 or 1440 may perform a controller function for implementing the aforementioned embodiments of the present invention, a variable Medium Access Control (MAC) frame control function based on service characteristics and a propagation environment, a handover (HO) function, an authentication and encryption function, etc.

The Tx module 1450 or 1460 may perform predetermined coding and modulation for data, which are scheduled from the processor 1430, 1440 and then transmitted to the outside, and then may transfer the coded and modulated data to the antenna. The Tx module and the antenna may be incorporated into a transmitting portion for transmitting the radio signal unlike FIG. 11.

The memory 1470 or 1480 may store a program for processing and control of the processor 1430 or 1440, or may perform a function for temporarily storing input/output data (uplink (UL) grant allocated from the base station in case of the user equipment), system information, base station identifier (STID), flow identifier (FID), and action time.

Also, the memory 1470 or 1480 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

The processor 1430 of the transmitter performs the whole control operation for the base station. Also, the processor 1430 of the transmitter may determine whether to retransmit the same signal or next signal to the receiver depending on whether a signal received through the Rx module 1410 is ACK/NACK/DTX.

If the signal received through the Rx module 1410 is the ACK signal, it indicates that the signal transmitted from the transmitter has been successfully transmitted and decoded. Accordingly, it is not required to retransmit the same signal. On the other hand, if the signal received through the Rx module 1410 is the NACK signal or DTX signal, it indicates that transmission of the signal transmitted from the transmitter has been failed. Accordingly, it is required to retransmit the same signal.

The processor 1440 of the receiver performs the whole control operation for the user equipment. Also, in order reduce a feedback information rate when feedback information is generated in accordance with the aforementioned embodiments of the present invention described with reference to FIG. 7 to FIG. 10, the processor 1440 of the receiver may use reduced ACK/NACK states in accordance with a predetermined rule or may perform bundling or joint coding for a plurality of ACK/NACK/DTX information using one signal received through the Rx module.

In more detail, the processor 1440 of the receiver determines ACK/NACK states for each of a plurality of data units received through the Rx module 1420. If the plurality of ACK/NACK states include a certain number of NACKs, they may be configured in a single NACK state.

Also, the processor 1440 of the receiver may configure the plurality of ACK/NACK states in the multiple ACK/NACK states or the single ACK/NACK state on the basis of carrier group. At this time, control information such as ACK/NACK states may be configured per carrier, and control information transmitted through different carriers may be multiplexed on the basis of the carrier group in accordance with a type of each of the plurality of carriers.

The processor 1430 or 1440 may be configured to transmit the aforementioned control information described in the embodiments of the present invention through separate signaling not DM-RS. In the mean time, the base station may perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or may further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The embodiments of the present invention may be applied to various wireless communication systems. Examples of the various wireless communication systems include 3GPP (3rd Generation Partnership Project), 3GPP2 and/or IEEE 802.xx (Institute of Electrical and Electronic Engineers 802) system. The embodiments of the present invention may be applied to all the technical fields based on the various wireless access systems, as well as the various wireless access systems.

The invention claimed is:

1. A method for transmitting control information from a user equipment (UE) in a wireless communication system, the method comprising:
   receiving a plurality of physical downlink shared channels (PDSCHs) on a primary cell;
   receiving a plurality of PDSCHs on a secondary cell,
   wherein the primary cell and the secondary cell are configured for the UE; and
   transmitting an acknowledgement (ACK)/negative acknowledgement (NACK) feedback for the received PDSCHs by using physical uplink control channel (PUCCH) resources corresponding to respective one of two antenna ports configured for the UE,
   wherein the ACK/NACK feedback indicates a first ACK/NACK state for each of the PDSCHs received on the primary cell, and
   wherein the ACK/NACK feedback further indicates a second ACK/NACK state for each of the PDSCHs received on the secondary cell.

2. The method according to claim 1, wherein the ACK/NACK feedback indicates a bundle of the first ACK/NACK state of the PDSCHs received on the primary cell and the second ACK/NACK state of the PDSCHs received on the secondary cell.

3. The method according to claim 1, wherein the ACK/NACK feedback is represented as 2 bits.

4. The method according to claim 1, wherein the ACK/NACK feedback is transmitted by using PUCCH format 1b.

5. A user equipment (UE) for transmitting control information in a wireless communication system, the UE comprising:
   a transmission module;
   a reception module configured to receive a plurality of physical downlink shared channels (PDSCHs) on a primary cell and receive a plurality of PDSCHs on a secondary cell,
   wherein the primary cell and the second cell are configured for the UE; and
   a processor configured to control the transmission module to transmit an acknowledgement (ACK)/negative acknowledgement (NACK) feedback for the received PDSCHs by using physical uplink control channel (PUCCH) resources corresponding to respective one of two antenna ports configured for the UE,
   wherein the ACK/NACK feedback indicates a first ACK/NACK state for each of the PDSCHs received on the primary cell, and
   wherein the ACK/NACK feedback further indicates a second ACK/NACK state for each of the PDSCHs received on the secondary cell.

6. The UE according to claim 5, wherein the ACK/NACK feedback indicates a bundle of the first ACK/NACK state of the PDSCHs received on the primary cell and the second ACK/NACK state of the PDSCHs received on the secondary cell.

7. The UE according to claim 5, wherein the ACK/NACK feedback is represented as 2 bits.

8. The UE according to claim 5, wherein the ACK/NACK feedback is transmitted by using PUCCH format 1b.

* * * * *